United States Patent [19]

Crane et al.

[11] Patent Number: 6,054,496
[45] Date of Patent: *Apr. 25, 2000

[54] METHOD FOR TRANSPORTING A HEAVY CRUDE OIL PRODUCED VIA A WELLBORE FROM A SUBTERRANEAN FORMATION TO A MARKET LOCATION AND CONVERTING IT INTO A DISTILLATE PRODUCT STREAM USING A SOLVENT DEASPHALTING PROCESS

[75] Inventors: Steven D. Crane; Gary L. Beer, both of Plano, Tex.; Harrison F. Blacker, Caracas, Venezuela

[73] Assignee: Atlantic Richfield Company, Los Angeles, Calif.

[ * ] Notice: This patent is subject to a terminal disclaimer.

[21] Appl. No.: 08/927,427

[22] Filed: Sep. 11, 1997

[51] Int. Cl.$^7$ .............................. C07C 27/00; B01D 3/00; C10G 3/00; C10G 1/00
[52] U.S. Cl. ........................ 518/702; 208/348; 208/370; 208/427; 208/39; 208/36; 208/86; 208/92; 423/650; 423/651; 137/16; 166/267; 166/50
[58] Field of Search .................................... 208/348, 370, 208/427, 39, 36, 92, 86; 166/267, 50; 423/650, 651; 137/16; 518/702

[56] References Cited

U.S. PATENT DOCUMENTS

| | | | |
|---|---|---|---|
| 1,655,603 | 1/1928 | Hanna . | |
| 1,666,597 | 4/1928 | Harnsberger . | |
| 1,727,380 | 9/1929 | Ryder . | |
| 3,617,481 | 11/1971 | Voorhies, Jr. et al. | 208/50 |
| 4,092,825 | 6/1978 | Egan | 60/39.02 |
| 4,218,287 | 8/1980 | Albright et al. | 201/9 |
| 4,226,830 | 10/1980 | Davis | 422/143 |
| 4,309,198 | 1/1982 | Moss | 48/197 R |
| 4,388,877 | 6/1983 | Molayem et al. | 110/342 |
| 4,407,367 | 10/1983 | Kydd | 166/267 |
| 4,420,008 | 12/1983 | Shu | 137/4 |
| 4,531,586 | 7/1985 | McMillen | 166/305 R |
| 4,570,656 | 2/1986 | Matlach et al. | 137/13 |
| 4,844,158 | 7/1989 | Jennings, Jr. | 166/267 |
| 5,015,356 | 5/1991 | Talbert | 208/16 |
| 5,097,903 | 3/1992 | Wilensky | 166/266 |
| 5,355,958 | 10/1994 | Pauls et al. | 166/307 |
| 5,406,786 | 4/1995 | Scharpf et al. | 60/39.05 |
| 5,671,810 | 9/1997 | Hodge et al. | 166/301 |
| 5,795,445 | 8/1998 | Boswell et al. | 201/39 |

FOREIGN PATENT DOCUMENTS

| | | | |
|---|---|---|---|
| 1238598 | 6/1988 | Canada | 196/83 |

OTHER PUBLICATIONS

U.S. application Ser. No. 08/834,007, Crane et al., filed Apr. 12, 1997.
U.S. application Ser. No. 08/834,009, Crane et al., Apr. 12, 1997.
U.S. application Ser. No. 08/927,206, Crane et al., filed Sep. 11, 1997.
U.S. application Ser. No. 09/104,511, Liu, filed Jun. 25, 1998.

"Air Partial Oxidation" by Surinder M. Marria, Chief Process Engineer, Foster Wheeler USA Corporation, Clinton, New Jersey; for Presentation at the Foster Wheeler Hydrogen Plant Conference, Orlando, Florida, Jun. 1992.

"FW Solvent Deasphalting" by F.M. Van Tine and Howard M. Feintuch; "Handbook of Petroleum Refining Processes", 2nd Ed., by Robert A. Meyers, Chapter 10.2; McGraw Hill, 1997.

Design Considerations for Utility Size CFB Steam Generators, James E. Maitland, Richards S. Skowyra, Bruce W. Wilhelm,, Power–Gen'94, Dec. 7–9, 1994 7th International Conference & Exhibition for the Power Generating Industries, Book III, pp. 45–47.

Using Low Cost Petroleum Coke to Produce Electricity: Jack L. Cotton, Jr. Sales Manager, Pyropower Corporation, Power–Gen'94, Dec. 7–9, 1994 7th International Conference & Exhibition for the Power Generating Industries, Book III, pp. 72–92.

Six Years of ABB–CE, Petcoke and Fluid Beds: Mike Tanca, Senior Consulting Fluidized Bed Engineer, Combustion Engineering Inc. Power–Gen'94, Dec. 7–9, 1994 7th International Conference & Exhibition for the Power Generating Industries, Book III, pp. 94–116.

Combustion Fossil Power Systems, A Reference Book on Fuel Burning and Steam Generation: Joseph G. Singer, 1981, chapter 24, pp. 19–28.

*Primary Examiner*—Paul J. Killos
*Assistant Examiner*—Jafar Parsa
*Attorney, Agent, or Firm*—F. Lindsey Scott

[57] ABSTRACT

A method for producing a heavy crude oil from a subterranean formation through a wellbore, transporting the heavy crude oil to a market location and converting the heavy crude oil into a product distillate hydrocarbon stream and by-products such as heat, steam, electricity and synthesis gas by separating distillable components of the heavy crude oil by distillation and solvent deasphalting and converting the asphaltic residual portion of the heavy crude oil in a fluidized bed to at least one of heat, steam, electricity or synthesis gas. The method also produces diluent hydrocarbons useful as a separate product, a distillable hydrocarbon stream or a diluent for use in the production and transportation of the heavy crude oil.

21 Claims, 4 Drawing Sheets

METHOD FOR TRANSPORTING A HEAVY CRUDE OIL PRODUCED VIA A WELLBORE FROM A SUBTERRANEAN FORMATION TO A MARKET LOCATION AND CONVERTING IT INTO A DISTILLATE PRODUCT STREAM USING A SOLVENT DEASPHALTING PROCESS

BACKGROUND OF THE INVENTION

1. Field of the Invention

This invention relates to a method comprising: producing a heavy crude oil from a subterranean formation via a wellbore; diluting the heavy crude oil with a suitable diluent and transporting the heavy crude oil/diluent mixture to a market location; converting the heavy crude oil into a product distillate hydrocarbon stream using a distillation process and a solvent deasphalting process and recovering added values from the residual asphaltic portions of the heavy crude oil in a fluidized bed to produce heat, electricity, steam or synthetic liquid hydrocarbons.

2. Description of Related Art

In many parts of the world heavy crude oils are available for production in remote locations. In such remote locations commonly available utilities such as electricity and steam may not be available at all or may be available only in short supply. In such instances, the only option may be to transport the heavy crude oil in a pipeline to a location from which it may be transported to a refinery. Many of the heavier components contained in the heavy crude oil may not be suitable for distillation into distillate hydrocarbon products and may eventually be converted into asphalt, petroleum coke or the like by currently used methods.

In less industrialized parts of the world there may be little market for such products. As a result the products may be of low value in the accessible marketplace. Alternatively, the heavier components may be blended with lighter oils to produce a heavy fuel oil product. Typically, the market value of such heavy fuel oils is relatively low, especially, when the value of the diluent oil as a distillate product is considered.

Such heavy crude oils in some instances, are so viscous that it may be difficult to recover the heavy crude oils from a subterranean formation initially without admixture of a hydrocarbon diluent with the heavy crude oil in the wellbore to reduce the viscosity of the heavy crude oil. Even if the heavy crude oil is at an elevated temperature in the subterranean formation which is high enough to result in a flowable heavy crude oil at the elevated temperature in the formation the heavy crude oil remains likely to cool and solidify in upper portions of the producing well, especially during any periods where production is stopped for an interval. Similarly the heavy crude oil is likely to cool and solidify in surface pipelines unless required temperatures and flow rates in the surface pipelines can be maintained. As a result typically distillate hydrocarbon diluents (or occasionally other diluents) are mixed with such heavy crude oils either during or after production and before pipelining to prevent solidification of the heavy crude oil in the pipeline.

Such heavy crude oils contain a much higher percentage of non-distillable components than lighter crude oils. Some such heavy crude oils may contain less than 50 weight percent distillable hydrocarbons.

The production and transportation of such heavy crude oils, especially in remote locations, requires that large quantities of hydrocarbon diluent be transported to the remote location via a pipeline, by truck or the like. This hydrocarbon diluent is expensive relative to the heavy crude oil even without considering the added transportation cost. The diluent when mixed with the heavy crude oil may result in a mixture which still contains as much as 45 weight percent residual (non-distillable) materials. Transportation of this mixture requires a larger pipeline and limits the production and transportation of the desired distillable components of the heavy crude oil. Even if transported to a refinery the residual materials are of little value and are typically charged to a petroleum coker or used as asphalt and the like. Typically such heavy crude oils also have a high metals content in the residual materials which reduces the value of any petroleum coke produced from such residual materials.

In U.S. Ser. No. 08/834,009 entitled "Method for Producing Heavy Crude Oil Via a Wellbore From a Subterranean Formation and Converting the Heavy Oil Into a Distillate Product Stream" filed Apr. 12, 1997 by Steven D. Crane and Gary L. Beer and assigned to Atlantic Richfield Company and in U.S. Ser. No. 08/834,007 entitled "Method for Producing From a Subterranean Formation Via a Wellbore, Transporting and Converting a Heavy Crude Oil Into a Distillate Product Stream" filed Apr. 12, 1997 by Steven D. Crane, Gary L. Beer and Harrison F. Blacker and assigned to Atlantic Richfield Company processes are disclosed wherein distillable product streams are recovered from heavy crude oil by atmospheric distillation and by vacuum distillation. The residues from the distillation process or the vacuum distillation process are passed to a fluidized bed for combustion to produce heat, steam, electricity or a synthesis gas. While such processes are effective to produce a distillate hydrocarbon product stream from a heavy crude oil, vacuum distillation is limited to separation of distillates having a boiling point at atmospheric pressure below about 1,060° F. Heavy crude oils contain distillable and refinable hydrocarbonaceous materials which are either incompletely recovered or which are not recovered to any substantial extent in the vacuum distillation process. It is desirable that these distillable materials be recovered from the heavy crude.

Accordingly, a continuing search has been directed to methods for producing such heavy crude oil, at remote sites and marketing both the valuable distillable hydrocarbons and the by-products from the non-distillable residues economically.

SUMMARY OF THE INVENTION

According to the present invention a heavy crude oil is produced from a subterranean formation through a wellbore penetrating the subterranean formation and converted into a distillable hydrocarbon product stream and at least one of heat, steam, electricity and synthesis gas at a market location by a method comprising: positioning a wellbore to extend from a surface into the subterranean formation; producing the heavy crude oil from the subterranean formation via the wellbore; diluting the heavy crude oil with a suitable diluent and transporting the diluted heavy crude oil to the market location; distilling the heavy crude oil in a crude oil distillation zone to produce a distillate hydrocarbon stream having a boiling range at atmospheric pressure below about 770° F. and a heavier hydrocarbon stream having a boiling range at atmospheric pressure above about 710° F.; separating a deasphalted oil stream from the heavier hydrocarbon stream in a deasphalting zone to produce a deasphalted oil stream and a residual asphaltic residue; and passing at least a portion of the residual asphaltic stream to a fluidized bed combustion zone for at least partial combustion to produce by-products comprising at least one of heat, steam, electricity and synthesis gas.

The present invention also includes a method comprising: positioning a wellbore to extend from a surface into a subterranean formation; producing a heavy crude oil from the subterranean formation via the wellbore; diluting the heavy crude oil with a suitable diluent and transporting the diluted heavy crude oil to a market location; distilling the heavy crude oil in a crude oil distillation zone to produce a distillate hydrocarbon stream having a boiling range at atmospheric pressure below about 770° F. and a heavier hydrocarbon stream having a boiling range at atmospheric pressure above about 710° F.; distilling the heavier hydrocarbon stream at a reduced pressure in a vacuum distillation zone to produce a heavier distillate hydrocarbon stream having a boiling range at the reduced pressure up to about 1060° F. and a hydrocarbonaceous residual stream having a boiling range above about 750° F. at the reduced pressure; separating a deasphalted oil stream from the hydrocarbonaceous residual stream in a deasphalting zone to produce a deasphalted oil stream and a residual asphaltic stream and passing at least a portion of the residual asphaltic stream to a fluidized bed combustion zone for at least partial combustion to produce by-products comprising at least one of heat, steam, electricity and synthesis gas. The distillate stream, the heavier distillate hydrocarbon stream and the deasphalted oil stream may be combined to produce a distillable hydrocarbon product stream from the process.

By the method of the present invention, a distillate hydrocarbon diluent which may be required for the production or transportation of the heavy crude oil may be produced as a portion of at least one of the distillable hydrocarbon stream and the heavier distillate hydrocarbon stream.

DESCRIPTION OF THE PREFERRED EMBODIMENTS

In the discussion of the Figures the same numbers will be used throughout to refer to the same or similar components. Pumps, valves and the like necessary to achieve the described process flows and the like are considered to be well known to the art and have not been shown.

Figure 1:
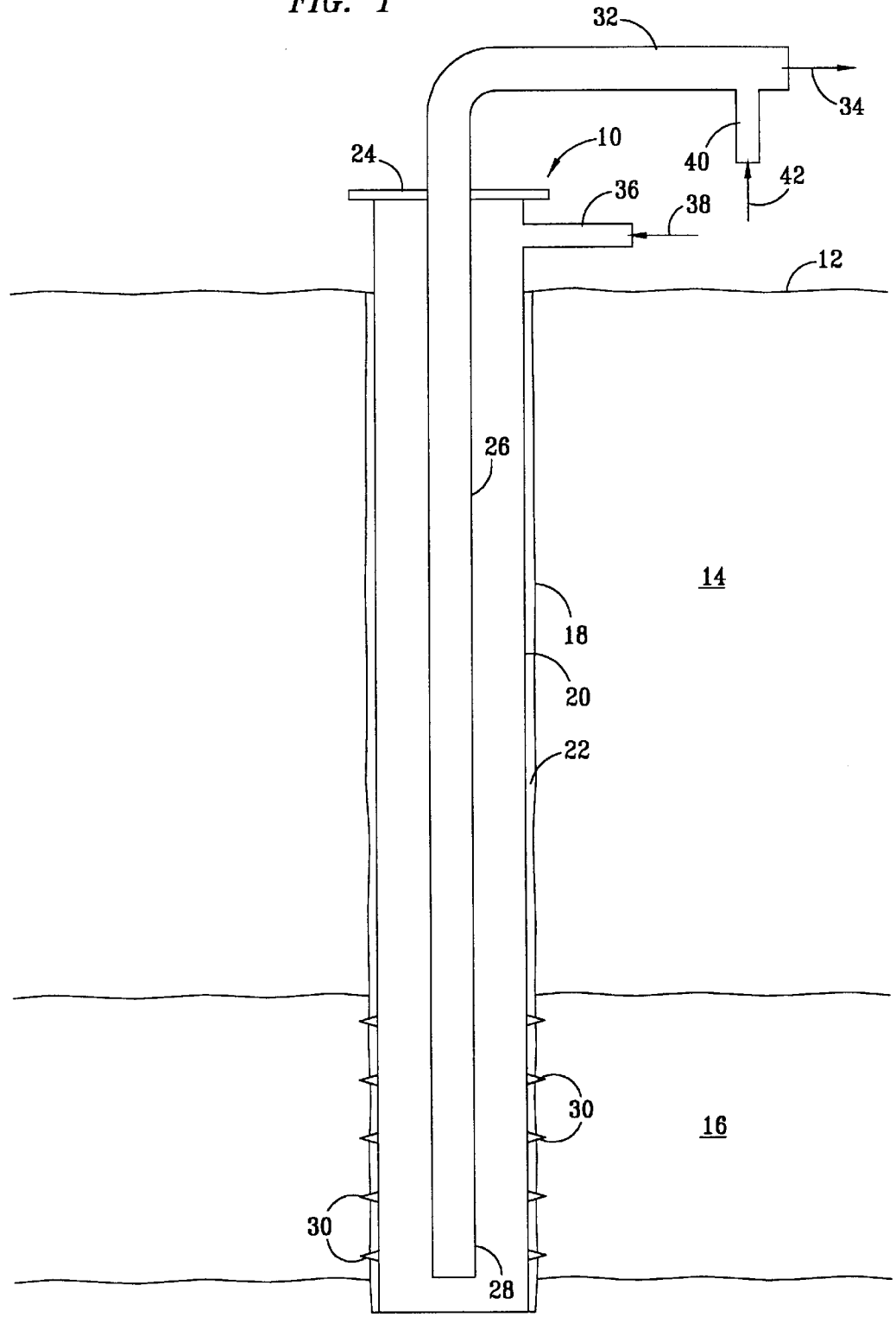
FIG. 1 is a schematic diagram of an oil well penetrating a heavy crude oil-bearing subterranean formation for the production of a heavy crude oil.

In FIG. 1 a well 10 is shown extending from a surface 12 through an overburden 14 and penetrating an oil-bearing formation 16. Well 10 comprises a wellbore 18 which includes a casing 20 which is cemented in place with cement 22 through formation 16. Well 10 also includes a well head 24 positioned on casing 20 as known to those skilled in the art for the injection of fluids and the production of fluids from well 10. Well 10 also includes a tubing 26 positioned in casing 20 and extending into formation 16 to a depth sufficient for the production of heavy crude oil from formation 16. The heavy crude oil flows into a lower end 28 of tubing 26 and upwardly through wellbore 10 either under formation pressure or with pumping.

Casing 20 includes perforations 30 penetrating formation 16 so that fluid communication is accomplished between formation 16 and the inside of casing 20. Heavy crude oil recovered through tubing 26 flows upwardly and as shown schematically, flows through tubing 26 into a pipeline 32 for transportation to a market location.

If necessary a diluent may be injected into casing 20 through a line 36 as shown by an arrow 38 and flows downwardly to admixture with the heavy crude oil recovered through tubing 26. Alternatively, a diluent may be mixed with the heavy crude oil in pipeline 32 by adding the diluent to pipeline 32 via a line 40 as shown by an arrow 42. a variety of techniques can be used for admixing the diluent with either the heavy crude oil in pipeline 32 or the heavy crude oil in well 10. For instance a second tubing (not shown) could be run to the bottom of well 10 for the injection of diluent or the diluent could be added to the heavy crude oil at any point along the length of tubing 26. Such variations are considered to be well known to those skilled in the art and have not been shown. The use of wells such as well 10 for the recovery of heavy crude oils from subterranean formations is considered to be well known to those skilled in the art.

The diluent may be a distillate hydrocarbon diluent which may be produced in a crude oil distillation unit or a vacuum flasher or by a combination of distillable hydrocarbons from a crude oil distillation unit and a vacuum flasher. Any suitable miscible material may be used as a diluent. The diluent is selected based upon the requirements for diluent properties, the value of the material used as a diluent and the like. The diluent stream is passed to heavy crude oil production or heavy crude oil transportation and may be to a large extent a recycled stream after start-up in the method of the present invention. The diluent may be a diesel fuel range hydrocarbon.

As disclosed in the two applications above, the heavy crude oil may be separated into a distillable hydrocarbon stream and a residual stream which is at least partially combusted in a fluidized bed to produce at least one of by-products such as steam, heat, electricity and synthetic fuels. In many instances, the distillable hydrocarbons may be pipelined or otherwise transported to a suitable market, to a refinery or the like, but there may be no market for the by-products near the production site or which is economically reachable from the production site. The heavy crude oil may be used more effectively in such instances by transporting the diluted heavy crude oil to a market location where both the distillable hydrocarbons and the by-products can be marketed (market location). A suitable market location may comprise a location at which the distillable hydrocarbons may be used or from which the distillable hydrocarbons may be transported to a suitable market and at which the by-products may be used or from which the by-products may be transported to a suitable market. Such a location may be at a port facility where the distillable hydrocarbons may be loaded onto a ship for transportation to use or sale with the by-products being marketed at or transported from the location to a suitable market economically reachable from the location.

Alternatively the heavy crude oil/diluent mixture may be transported by ship, pipeline or the like to a terminal or port facility where a market exists for both or either of the distillable hydrocarbons and the by-products at the location or is economically reachable from the location.

The diluent may be any suitable material as discussed below and may be recovered in the distillation of the present invention as a separate marketable product at the market location or as a distillate diluent stream which may be returned to the production site if desired for use to dilute additional heavy crude oil.

Figure 2:
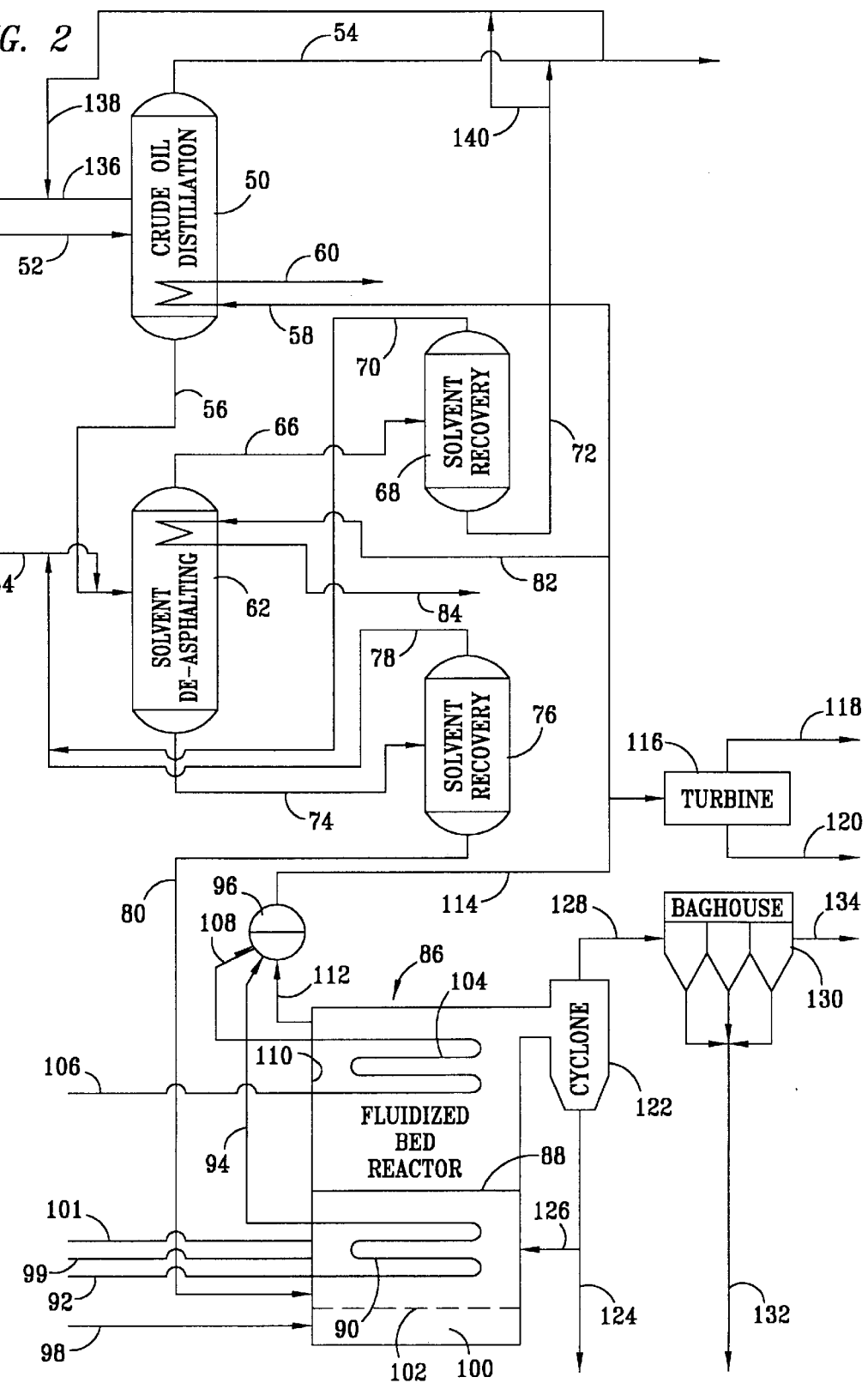
FIG. 2 is a schematic diagram of an embodiment of the process of the present invention wherein a heavy crude oil is distilled in a crude oil distillation unit at a market location with the bottoms stream being passed to a solvent deasphalting unit to separate a deasphalted oil stream and an asphaltic residue which is combusted in a fluidized bed to produce steam, a portion of which is used in the distillation and solvent deasphalting and a portion of which is used for the generation of electricity.

In FIG. 2 a crude oil distillation unit 50 is shown at a market location. A heavy crude oil/diluent mixture is charged to crude oil distillation unit 50 through a line 52 and distilled in unit 50 to produce a distillate hydrocarbon stream recovered through a line 54 and a bottoms stream recovered through a line 56. Steam is supplied to unit 50 via a line 58 to supply heat for the distillation operation with spent steam being recovered through a line 60 and passed to steam recovery, further use as a heating medium, water recovery or the like. While shown as a single stream 54 the distillate hydrocarbons may be recovered as a plurality of streams (not shown).

The distillation in unit 50 typically separates distillable hydrocarbon materials which are readily separable from the crude oil at atmospheric pressure from the heavier portions of the crude oil. The distillation end point is a function of the crude oil feed to unit 50 and a variety of other factors known to those skilled in the art. Typically, the materials recovered as distillates have boiling ranges below about 710° F. to about 770° F. at atmospheric pressure. Such materials include light hydrocarbons and distillate products such as straight run gasoline, kerosene, diesel fuel and the like.

The bottoms stream recovered from distillation unit 50 through line 56 is passed to a solvent deasphalting unit 62. The bottoms stream in line 56 is mixed with a suitable solvent from line 64. The solvent is typically a paraffinic hydrocarbon solvent comprising paraffins containing from about 3 to about 7 carbon atoms. The use of such processes is well known to those skilled in the art as shown, for instance, in "Handbook of Petroleum Refining Processes", Robert A. Meyers, Editor in Chief, McGraw Hill, 1997, Chapter 10.2 "FW Solvent Deasphalting" by F. M. Van Tine and Howard M. Feintuch. Solvent deasphalting processes are typically used as an extension of vacuum distillation. The recovery of distillable hydrocarbons from heavy hydrocarbonaceous streams by vacuum distillation is dependent upon a boiling point distillation of the distillable hydrocarbon materials. The recovery of distillable hydrocarbons having a boiling point above about 1060° F. at atmospheric pressure by vacuum distillation requires distillation at temperatures at which thermal cracking reactions occur at a speed which makes such distillation separations impractical. As a result, solvent deasphalting is used with such streams. While solvent deasphalting is typically used after a vacuum distillation step as will be discussed hereafter in conjunction with FIG. 3, solvent deasphalting can also be used with the bottoms streams from an atmospheric pressure crude oil distillation. The separation of distillable hydrocarbons is accomplished by differences in solvent solubility rather than by temperature distillation. This separation results in the recovery of the more soluble materials from the heavy hydrocarbon stream and produces a distillable stream which is generally somewhat less reactive than the stream from a vacuum distillation unit since it does not contain the olefins and other reactive materials which result from cracking and which are frequently found in vacuum distillation residues.

Solvent deashing unit 62 is any suitable counter-current liquid/liquid contacting vessel. This vessel may be a stirred vessel with a plurality of plates, a packed column or the like. Since the solubility of the heavy oils in the paraffinic solvent is reduced by increasing the temperature (i.e. decreasing the density) of the paraffinic solvent, the temperature may be increased in the upper portion of solvent deasphalting unit 62 for reflux generation and the like. The temperature may be increased by charging steam to deasphalting unit 62 through a line 82, as shown, with spent steam being recovered through a line 84 and passed to further heat exchange, recovery as spent steam and the like. In such processes, a significant part of the process relates to the recovery of the solvent used for the separation of the deasphalted oil and the asphalt and asphaltene compounds. A variety of techniques have been used for this solvent recovery varying from distillation to super-critical separation. The super-critical separation processes generally heat the paraffinic solvent to a temperature such that its ability to dissolve the deasphalted oil or the asphalt and asphaltene compounds (asphaltic residue) is reduced to the point that a relatively pure solvent can be recovered by liquid/liquid separation. Such recovery systems are well known to those skilled in the art as discussed in the "Handbook of Petroleum Refining Processes". In FIG. 2, the overhead stream in line 66 which contains paraffinic solvent and deasphalted oil is passed to a solvent recovery process 68. Solvent recovery process 68 has been shown schematically and should be understood to include a plurality of vessels as required to accomplish the desired separation in the process selected for the separation. The purified solvent is recovered through a line 70 and passed to combination with the paraffinic solvent charged to solvent deasphalting unit 62 through line 64. The deasphalted oil is recovered and may be passed to combination with the distillate hydrocarbon stream from crude oil distillation unit 50 in line 54. A bottoms stream is recovered from solvent deasphalting unit 62 which contains asphalt, asphaltenes and other heavy residual compounds (herein referred to as "asphaltic residue") is passed to a solvent recovery process 76 where the paraffinic solvent is separated and recovered through a line 78 and passed back to combination with the paraffinic solvent in line 64 with the asphaltic residue being recovered through a line 80. It should be understood that solvent recovery section 76 may also comprise a plurality of vessels as required to accomplish the desired separation as known to those skilled in the art. The asphaltic residue in line 80 is passed to a fluidized bed reactor 86. Fluidized bed reactor 86 may be of a variety of types known to those skilled in the art and may, for instance, comprise a fluidized bed combustion boiler, a circulating fluidized bed or the like. Such units are considered to be well-known to those skilled in the art. Some such units are discussed in "Design Considerations for Utility Size CFB Steam Generators", Maitland, James E., Skowyra, Richard S., and Wilhelm, Bruce W., Power-Gen '94, 7th International Conference and Exhibit for the Power Generating Industries, Orange County Convention Center-Orlando, Fla., Dec. 7–9, 1994, pp. 45–47; "Using Low Cost Petroleum Coke to Produce Electricity", by Cotton, Jack L. Jr., Power-Gen '94, 7th International Conference and Exhibit for the Power Generating Industries, Orange County Convention Center-Orlando, Fla., Dec. 7–9, 1994, pp. 72–92; and "Six Years of ABB-CE, Petcoke and Fluid Beds, Tanca, Mike, Power Gen '94, 7th International Conference and Exhibit for the Power Generating Industries, Orange County Convention Center-Orlando, Fla., Dec. 7–9, 1994, pp. 93–116.

Fluidized bed reactor 86, as shown in FIG. 2, is a schematic diagram of a fluidized bed reactor. The fluidized bed 88 in reactor 86 is of a depth to cover heat exchanger tubes 90 which are positioned to receive water from a line 92 and produce steam through a line 94. The steam produced through line 94 is routed to a steam drum 96. The solids in fluidized bed 88 may be any suitable finely divided carbonaceous or inorganic material and may be, for instance, finely divided petroleum coke, finely divided coal, pyrolysis products from the feed, particulate limestone, finely divided silica, silica alumina, alumina or the like. As the asphaltic residual stream in line 80 is charged to reactor 86 it is anticipated that carbonaceous solids (pyrolysis products) sufficient to maintain the depth of fluidized bed 88 will be formed in bed 88 by thermal decomposition of the residual stream. The asphaltic residual stream in line 80 is desirably passed directly from solvent recovery unit 76 to reactor 86 so that heat values present in the stream in line 80 are realized in reactor 86. Alternatively, the asphaltic residual stream in line 80 may pass through an intermediate storage, heat exchange or the like prior to charging the asphaltic residual stream to reactor 86.

Air, or other oxygen-containing gas is introduced into a plenum zone 100 beneath fluidized bed 88 via a line 98. As known to those skilled in the art, the air is injected beneath a grid plate 102 and fluidizes bed 88 above grid plate 102. Air or other gas is charged to fluidize bed 88 at a rate sufficient to maintain the desired turbulence and combustion in fluidized bed 88. In fluidized bed 88 combustion is generally at a temperature sufficiently low that relatively low amounts of $NO_x$ compounds are formed. As also known to those skilled in the art, limestone or other calcium-containing materials may be charged to fluidized bed 88 via a line 99. Sulfur oxides formed in bed 88 are then absorbed by the calcium-containing material charged to fluidized bed 88. The fluidized bed may be operated to produce a flue gas resulting from relatively complete combustion of the residual stream in line 80 or a synthesis gas by operation to produce a partially oxidized gaseous stream comprising carbon monoxide and hydrogen. Such variations are considered to be well-known to those skilled in the art. In either event considerable heat is produced by the oxidation reactions in fluidized bed 88. Heat values are recovered from the hot gases by heat exchange tubes 104 positioned in the upper portion of fluidized bed unit 86. Water is charged to heat exchanger tubes 104 through a line 106 with steam being recovered via a line 108 and passed to steam drum 96.

Further, the walls of reactor 86 are formed of a plurality of heat exchange tubes (not shown) above fluidized bed 88. These tubes are schematically shown by the numeral 110 and produce steam which is recovered via a line 112 and passed to steam drum 96. It is well known to those skilled in the art that in the event it is desired to produce steam at different temperatures from different heat exchanger tubes, a plurality of steam drums 96 can be used.

A portion of the steam recovered from drum 96 is passed through a line 114 to a turbine 116 where it is used to produce electricity which is recovered through a line 118 and spent steam which is recovered through a line 120. The operation of such turbines is considered to be well known to those skilled in the art. Similarly, the recovery of spent steam and its use to recover additional heating values or water is considered to be well known to those skilled in the art. A portion of the steam from line 114 is used to supply heat via lines 58 and 82 to distillation unit 50 and solvent deasphalting unit 62. Steam may also be supplied to other process units as required.

A cyclone 122 is used to separate finely divided solids which may be entrained from fluidized bed 88 for return to fluidized bed 88 via a line 126. A line 124 is shown for the periodic removal of materials from the finely divided solids recovered in cyclone 122. The flue gas recovered from cyclone 122 is passed through a line 128 to a bag house 130 where the remaining finely divided solids are recovered for disposal through a line 132 with the cleaned flue gas or, alternatively, synthesis gas or the like, being recovered through a line 134 and passed to discharge, further processing or the like.

In some instances, additional treatment may be necessary before the flue gas recovered through line 134 can be discharged to the atmosphere. As discussed previously, when calcium compounds are used in fluidized bed 88 to recover additional sulfur oxides, the sulfur oxides may be reduced to levels sufficient for discharge to the atmosphere.

Sulfur reactive compounds such as limestone and the like used to recover sulfur oxides formed in fluidized bed 88 are generally required to be present in an amount equal to approximately twice the stoichiometric amount necessary to react with the sulfur oxides formed. Additional quantities are effective to further reduce the amount of sulfur oxides emitted from fluidized bed 88.

Similarly, the injection of compounds such as ammonia into the hot gas sections of reactor 86 is effective to reduce the amount of nitrogen oxides emitted in the flue gas. As a result the gaseous streams emitted from such fluidized bed units are frequently sufficiently low in pollutant materials that they can be discharged to the atmosphere after passing through a baghouse or other finely divided solids separation unit.

The process for the recovery of the heavy crude oil may require the use of a distillate diluent for mixture with the oil either in the wellbore or in a pipeline for transportation of the heavy crude oil. Such distillate diluents may readily be produced or recovered in crude oil distillation unit 50 as shown by a line 136 and transported back to the production site by pipeline, truck or other suitable transportation.

The deasphalted oil may be combined with the distillate hydrocarbon product stream recovered from distillation unit 50 in line 54 for transportation via a pipeline or the like to a market for the distillable hydrocarbon stream. The distillable diluent is selected as discussed previously based upon the requirements for solubility, cost of the stream and other factors well known to those skilled in the art. Typically the recyclable distillable diluent may be recovered and returned to the production site for reuse or recycled in the process of the present invention. Alternatively, the diluent may be a commercially available hydrocarbon such as diesel fuel which may be purchased and transported to the production site for use as a diluent and then recovered at the market location either as a part of the distillable hydrocarbon stream, as a separate marketable hydrocarbon product or as a diluent stream for return to the production site.

Figure 3:
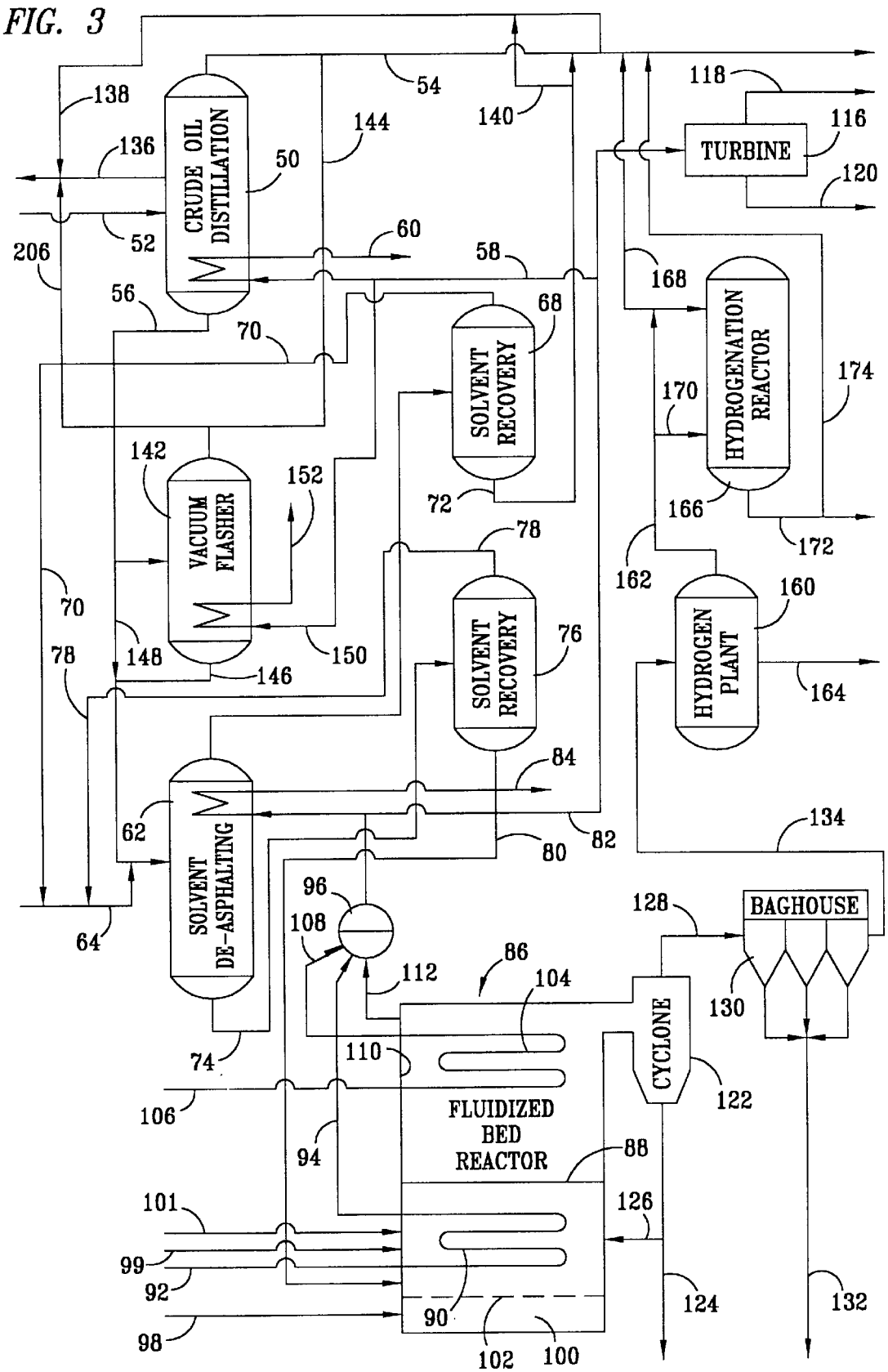
FIG. 3 is a schematic diagram of a variation of the process of the present invention wherein the bottoms stream from the crude oil distillation unit is passed to a vacuum flasher for the separation of a heavier distillate product stream with the vacuum flasher bottoms then being passed to a solvent deasphalting unit for the separation of a deasphalted oil stream and a residual asphaltic stream which is passed to a fluidized bed for combustion to produce a synthesis gas which is used to produce hydrogen for use in a hydrogenation reactor.

In FIG. 3 a further embodiment of the process of the present invention is shown. In FIG. 3 crude oil distillation unit 50 functions as discussed in connection with FIG. 1 except that the bottoms stream in line 56 is passed to a vacuum flasher 142. In vacuum flasher 142 the heavy hydrocarbonaceous stream recovered through line 56 is distilled under a relatively high vacuum, i.e. typically from about 2 to 4 inches of water, with additional distillate material being recovered overhead through a line 144 and combined with the distillate material in line 54. The distillate material recovered through line 144 typically has a boiling range below about 750° F. to about 1060° F. at the reduced pressure in vacuum flasher 142. Such materials are generally referred to as heavy gas oils and are suitably fed to further refining in a unit such as a fluidized catalytic cracking unit, a fixed bed hydrocracking unit or the like. The heat required in vacuum flasher 142 is supplied by steam via a line 150 with the spent steam being recovered via a line 152 and passed to steam recovery, water recovery or the like. The heavy residual hydrocarbonaceous stream having a boiling point above about 750° F. to about 1060° F. recovered from vacuum flasher 142 via a line 146 is a stream which is frequently used as asphalt, fed to a delayed petroleum coker to produce petroleum coke, blended with a relatively heavy distillate hydrocarbon stream and marketed as a heavy fuel or the like. As discussed previously, however, this stream still contains distillable hydrocarbon materials which are not separated by vacuum distillation. These materials are, however, readily recovered by a solvent deasphalting process. Accordingly, in the embodiment shown in FIG. 3, the heavy hydrocarbonaceous residue resulting from the vacuum distillation operation is passed through a line 146 to solvent deasphalting unit 62 which functions as discussed previously in FIG. 2. The deasphalted oil recovered in the solvent deasphalting process may be passed to combination with the distillable hydrocarbon stream in line 54 as discussed previously.

In other aspects, the process shown in FIG. 3 operates as discussed in conjunction with FIG. 2. One additional feature shown in FIG. 3 is the use of a hydrogen plant and a hydrogenation reactor. The fluidized bed reactor 86 is operated to produce a synthesis gas which is recovered in a line 134 and processed by well known water gas shift reactions and the like in a hydrogen plant 160 to produce a hydrogen stream recovered through a line 162 and a waste gas stream recovered through a line 164. The hydrogen stream in line 162 is passed to combination with all or a portion of the distillable hydrocarbon stream from line 54 in a line 168 for treatment in a hydrogenation reactor 166. The hydrogen may be charged to hydrogenation reactor 166 at a plurality of injection points (not shown), via a line 170 or the like as well known to those skilled in the art for effective contact with the distillable hydrocarbon stream. Hydrogen may be mixed with the distillable hydrocarbon stream as it enters reactor 166 and at a plurality of points along the length of reactor 166. The operation of such reactors is considered to be well known to those skilled in the art. The hydrogenated distillate hydrocarbon stream is then recovered through a line 172 and returned to line 54 for pipelining to a market for the distillable hydrocarbon stream. As noted previously, all or a portion of the stream in line 54 may be hydrogenated in reactor 166. For instance, either the vacuum distillation distillate or the solvent deasphalted oil may be hydotreated alone or as a combined stream. The use of the hydrogenation reactor upgrades the distillable hydrocarbon product which may include heavier, more difficultly handled products as a result of the deeper extraction accomplished by the use of the combination of the vacuum flasher and the solvent deasphalting unit.

Such hydrogenation reactors are considered to be well known to those skilled in the art and typically comprise a reactor wherein hydrocarbons are contacted with hydrogen in the presence of a suitable catalyst such as cobalt/molybdenum supported on alumina or silica alumina.

Figure 4:
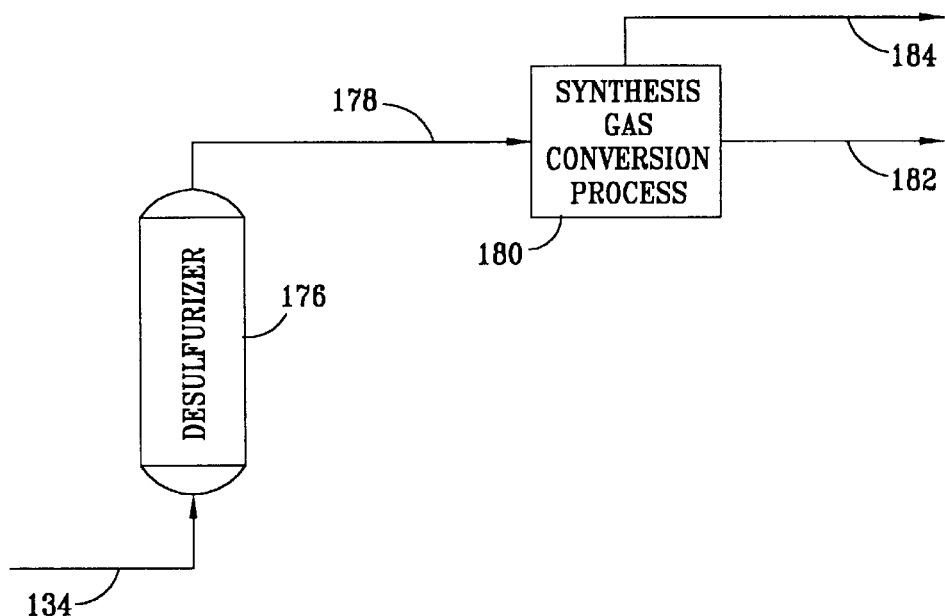
FIG. 4 is a schematic diagram of a variation of the process of the present invention wherein the fluidized bed is operated to produce a synthesis gas which is passed to a desulfurizer and to a synthesis gas conversion process for the production of liquid hydrocarbons; and, FIG. 5 is a schematic diagram of a further variation of the process of the present invention wherein the fluidized bed is operated to produce a synthesis gas stream which is passed to a synthesis gas combuster where the synthesis gas is combusted to produce an exhaust gas which is used to produce electricity in an exhaust gas turbine and heat which is used to produce steam, which is used to produce electricity in a steam turbine.

In FIG. 4 a further variation of the process of the present invention is shown. The synthesis gas stream recovered through line 134 is passed through a hot gas desulfurizer 176, such as a zinc oxide bed or the like, to produce a desulfurized synthesis gas stream in line 178 which is passed to a water gas shift process (not shown) or the like to adjust the carbon/hydrogen ratio in the synthesis gas mixture to a desired value and then converted to desirable synthetic hydrocarbon products which may vary from methane to synthetic liquid hydrocarbons such as gasoline and the like in a synthesis gas process 180. Such processes are considered to be well known to those skilled in the art. In synthesis gas conversion process 180 synthetic liquid hydrocarbons are produced and passed through a line 184 to combination with the hydrocarbon stream in line 54 or the like. An exhaust gas stream is recovered through a line 182 and may be passed to use as a fuel stream or the like.

Figure 5:
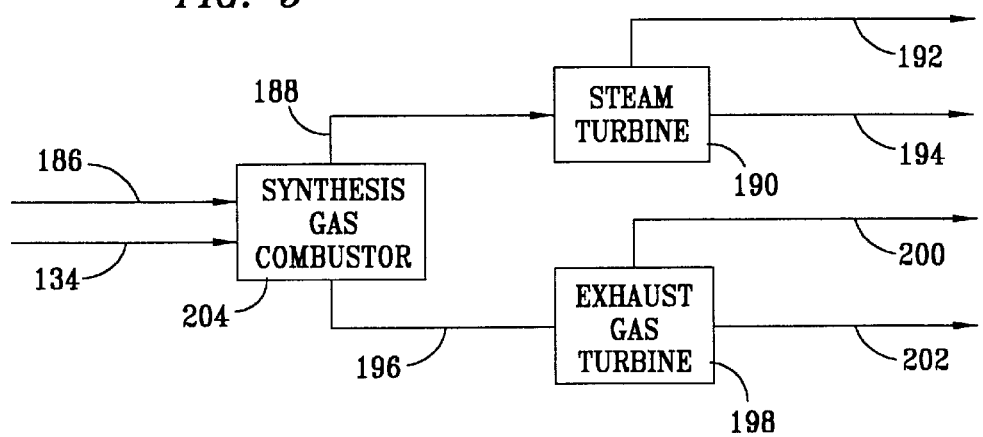

In a further variation of the process of the present invention shown in FIG. 5, a synthesis gas stream recovered through line 134 is passed to a synthesis gas combuster 204 with an oxygen-containing stream supplied via a line 186. The synthesis gas is combusted to produce heat which is recovered as steam in a line 188 which is passed through a steam turbine 190 which produces electricity through an electric line 192 and a spent steam stream which is recovered through a line 194. The exhaust gas stream produced in synthesis gas combuster 204 is passed to an exhaust turbine through a line 196 where it is used to produce additional electricity which is recovered through a line 200 with the exhaust gas being discharged through a line 202.

By the process of the present invention a low-value residual material from a heavy crude oil is used to produce electricity which is readily transported and used as a separate product, and desirable synthetic hydrocarbons and the like. The heavy residual compounds are of less value than the distillable hydrocarbon compounds and are desirably removed from the heavy crude oil stream prior to attempting to market the distillable hydrocarbon compounds. The removal of the heavy components of the heavy crude oil stream results in a distillable hydrocarbon stream of increased value and reduced volume.

Since such heavy crude oils contain a large amount of heavy residual material and since the heavy residual materials are of lower value, it is generally desirable to optimize the amount of distillable hydrocarbons recovered from such crude oil streams. The use of atmospheric distillation in vessel 50 in combination with the solvent deasphalting is effective to recover a large quantity of the distillable hydrocarbons from the heavy crude oil stream. The amount of recovery achieved in the solvent deasphalting unit is a function of solubility differences in the paraffinic solvent used. The percentage recovery of distillable hydrocarbons from the asphaltic residual materials is increased by selectively removing increased quantities of distillable hydrocarbons prior to the solvent deasphalting process. This can be accomplished to an extent in crude oil distillation unit 50 but is more desirably accomplished using both crude oil distillation 50 and vacuum flasher 142. This results in an increased recovery of distillable hydrocarbon materials from the residual stream passing to solvent deasphalting unit 62. The amount of distillable hydrocarbon material recoverable from this residual stream as deasphalted oil is then reduced so that the ultimate recovery from the residual components of the heavy crude oil stream can be optimized as shown.

In the process shown in FIG. 3 the diluent may be recovered from the distillate hydrocarbon stream from unit 50. The diluent as noted may be recovered for sale as a part of the distillate hydrocarbon stream, as a separate product, returned to the production site for use as a diluent and the like.

The operation of fluidized bed unit 86 to produce a variety of products varying heat values and a fully combusted flue gas to a synthesis gas is considered to be well known to those skilled in the art. It is well-known to those skilled in the art that when such beds are operated with limited oxygen, a partially oxidized exhaust gas stream is produced. Natural gas supplied via a line 101 may also be used as a second fuel feed to such beds to control the hydrogen/carbon monoxide ratio and produce synthesis gas. The partially oxidized stream comprising a synthesis gas stream may be desulfurized and passed to a synthesis gas reactor for the production of desirable hydrocarbon products or it may be passed to a synthesis gas combuster and combusted further to produce heat or to drive exhaust gas turbines.

By the process of the present invention considerable value has been added to the heavy crude oil by transporting it to a market location and then separating it into a product distillate stream and valuable by-products at a location where there is a market for both the distillate stream and the by-products. Th distillable hydrocarbon stream contains the distillable hydrocarbon components of the heavy crude oil which have been selectively recovered from the heavy crude oil stream in operations which can be readily conducted at the market location. The distillate hydrocarbon stream produced through line 54 may be passed to a pipeline and transported to a refinery or other market for the distillable hydrocarbon products reachable from or available at the market location. The residual components of the crude oil have been selectively isolated from distillable components of the crude oil and passed to a fluidized bed where such components are readily combusted to produce other desirable products which are marketable at the market location or at a location reachable from the market location. The electricity so produced may be readily transported via electric transmission lines to markets for the electricity and the fluidized bed may be used to produce gaseous or liquid hydrocarbons which may be transported alone or with the distillable hydrocarbons in line 54. Further, the present process also contemplates the use of the residual materials to generate hydrogen which may be used to upgrade the distillable hydrocarbons in line 54. It is desirable that the residual components in the crude oil be used to facilitate the processing and upgrading of the more valuable distillable components of the heavy crude oil and the production of valuable by-products. This is accomplished to a high degree by the process of the present invention.

Having thus described the invention by reference to certain of its preferred embodiments, it is pointed out that the embodiments described are illustrative rather than limiting in nature and that many variations and modifications are possible within the scope of the present invention. Many such variations and modifications may be considered obvious and desirable to those skilled in the art based upon a review of the foregoing description of preferred embodiments.

Having thus described the invention, we claim:

1. A method for producing a heavy crude oil from a subterranean formation penetrated by a wellbore, transporting the heavy crude oil to a market location and converting the heavy crude oil into a product distillate hydrocarbon stream and by-products comprising at least one of heat, steam, electricity and a synthesis gas, the method comprising:

a) producing the heavy crude oil from the subterranean formation via the wellbore;

b) diluting the heavy crude oil with a suitable diluent and transporting the heavy crude oil to a market location;

c) distilling the heavy crude oil at the market location in a crude oil distillation zone to produce a distillate hydrocarbon stream having a boiling range at atmospheric pressure below about 770° F. and a heavier hydrocarbon stream having a boiling range at atmospheric pressure above about 710° F.;

d) separating a deasphalted oil stream from the heavier hydrocarbon stream in a deasphalting zone to produce a deasphalted oil stream and a residual asphaltic stream; and, e) passing the residual asphaltic stream and a sulfur-reactive compound to a fluidized bed combustion zone for at least partial combustion to produce at least one of heat, steam, electricity and a synthesis gas.

2. The method of claim 1 wherein the distillate hydrocarbon stream and the deasphalted oil stream are combined to produce the product distillate hydrocarbon stream.

3. The method of claim 1 wherein the residual asphaltic stream is passed to the fluidized bed combustion zone from the deasphalting zone at an elevated temperature.

4. The method of claim 1 wherein the asphaltic residual stream is combusted in the fluidized bed to produce at least one of heat, steam, electricity and a synthesis gas.

5. The method of claim 4 wherein a portion of the steam is used in at least one of the crude oil distillation zone and the deasphalting zone.

6. The method of claim 4 wherein a portion of the steam is used to generate electricity.

7. The method of claim 1 wherein a portion of the synthesis gas is converted into liquid hydrocarbons in a synthesis gas conversion zone.

8. The method of claim 2 wherein a distillate hydrocarbon diluent is recovered as a part of the distillate hydrocarbon stream, as a separate product or as a diluent stream.

9. A method for producing a heavy crude oil from a subterranean formation penetrated by a wellbore, transporting the heavy crude oil to a market location and converting the heavy crude oil into a product distillate hydrocarbon stream and by-products comprising at least one of heat, steam, electricity and a synthesis gas, the method comprising:

a) producing the heavy crude oil from the subterranean formation via the wellbore;

b) diluting the heavy crude oil with a suitable diluent and transporting the heavy crude oil to a market location;

c) distilling the heavy crude oil in a crude oil distillation zone at the market location to produce a distillate hydrocarbon stream having a boiling range at atmospheric pressure below about 770° F. and a heavier hydrocarbon stream having a boiling range at atmospheric pressure above about 710° F.;

d) distilling the heavier hydrocarbon stream at a reduced pressure in a vacuum distillation zone to produce a heavier distillate hydrocarbon stream having a boiling range at the reduced pressure up to about 1060° F. and a hydrocarbonaceous residual stream having a boiling range above about 750° F. at the reduced pressure;

e) separating a deasphalted oil stream from the hydrocarbonaceous residual stream in a deasphalting zone to produce a deasphalted oil stream and a residual asphaltic stream; and, f) passing the hydrocarbonaceous residual stream and a sulfur-reactive compound to a fluidized bed combustion zone for at least partial combustion to produce at least one of heat, steam, electricity and a synthesis gas.

10. The method of claim 9 wherein the distillate hydrocarbon stream, the heavier distillate hydrocarbon stream and the deasphalted oil stream are combined to produce the product distillate hydrocarbon stream.

11. The method of claim 9 wherein the residual asphaltic stream is passed to a fluidized bed from the deasphalting zone at an elevated temperature.

12. The method of claim 9 wherein the residual asphaltic stream is combusted in the fluidized bed to produce steam.

13. The method of claim 12 wherein a portion of the steam is used in at least one of the crude oil distillation zone, in the vacuum distillation zone and the deasphalting zone.

14. The method of claim 12 wherein a portion of the steam is used to generate electricity.

15. The method of claim 12 wherein a portion of the synthesis gas is converted into liquid hydrocarbons in a synthesis gas conversion zone.

16. The method of claim 9 wherein a distillate hydrocarbon diluent is recovered as a portion of the distillate hydrocarbon stream, as a separate product stream or as a diluent stream.

17. The method of claim 16 wherein the diluent is mixed with the heavy crude oil in the well.

18. The method of claim 16 wherein the diluent is mixed with the heavy crude oil after production of the heavy crude oil.

19. The method of claim 16 wherein the heavy crude oil is diluted to produce a heavy crude oil/diluent mixture having a viscosity suitable for transportation in a pipeline.

20. The method of claim 9 wherein at least a portion of the product distillate hydrocarbon stream is hydrogenated in a hydrogenation zone.

21. The method of claim 20 wherein hydrogen is produced from the synthesis gas from the fluidized bed and at least a portion of the hydrogen is used to hydrogenate the portion of the product distillate hydrocarbon stream.

* * * * *